Feb. 26, 1963 J. SIMON 3,078,882
BAIL ATTACHER
Filed March 13, 1959 12 Sheets-Sheet 1

INVENTOR.
JACOB SIMON
BY
Norman N. Popper
ATTORNEY

Feb. 26, 1963   J. SIMON   3,078,882
BAIL ATTACHER
Filed March 13, 1959   12 Sheets-Sheet 2

INVENTOR.
JACOB SIMON
BY
Norman A. Popper
ATTORNEY

INVENTOR.
JACOB SIMON
BY
ATTORNEY

Feb. 26, 1963  J. SIMON  3,078,882
BAIL ATTACHER
Filed March 13, 1959  12 Sheets-Sheet 5

INVENTOR.
JACOB SIMON
BY Norman N. Pfeffer
ATTORNEY

INVENTOR.
JACOB SIMON
BY
Norman N. Popper
ATTORNEY

Feb. 26, 1963    J. SIMON    3,078,882
BAIL ATTACHER

Filed March 13, 1959    12 Sheets-Sheet 9

INVENTOR.
JACOB SIMON
BY Norman N. Popper
ATTORNEY

Feb. 26, 1963  J. SIMON  3,078,882
BAIL ATTACHER

Filed March 13, 1959 12 Sheets-Sheet 11

INVENTOR.
JACOB SIMON
BY
Norman N. Popper
ATTORNEY

Feb. 26, 1963    J. SIMON    3,078,882
BAIL ATTACHER
Filed March 13, 1959    12 Sheets-Sheet 12

INVENTOR.
JACOB SIMON
BY
ATTORNEY

United States Patent Office 3,078,882
Patented Feb. 26, 1963

3,078,882
BAIL ATTACHER
Jacob Simon, 36 Shelley Road, Springfield, N.J.
Filed Mar. 13, 1959, Ser. No. 799,251
10 Claims. (Cl. 140—93)

My invention relates generally to bail attachers and specifically to apparatus for attaching a bail to sockets on a can.

It is an object of my invention to provide an apparatus which will form a bail and attach it to a can.

Yet a further object of my invention is to provide a machine for orienting cans for automatic insertion of a bail.

A further object of my invention is to provide a machine for forming a bail.

A still further object of my invention is to provide a machine for inserting a bail in bail sockets.

A still further object of my invention is to provide a bail inserter which is complete in the performance of all steps necessary to provide a can with a bail.

These objects and advantages, as well as other objects and advantages, may be achieved by the device illustrated in the drawings in which:

FIGURE 7a is a partial front elevational view of the slider drive;

FIGURE 11A is a front elevational view showing a wire about to be formed into an arch;

FIGURE 11B is a front elevational view showing a wire formed into an arch;

FIGURE 11C is a side view showing the wire having the offsets formed thereon;

FIGURE 11D is a front elevational view of the wire with the ends turned inwardly;

FIGURE 11E is a front elevational view of the wire bail with the ends inserted in a can socket;

FIGURE 12 is an elevational view of the can orientation means;

FIGURE 13 is a side elevational view of the wire feed;

FIGURE 20 is a view showing the operative connections from the motor to the various drive shafts.

Conveyor

My bail attacher provides a base 51 upon which there is mounted a longitudinal conveyor belt 52. The belt runs on sprockets 53, positioned at opposite ends of the apparatus; the belt, intermediate of the sprockets, rides over a table 54 which constitutes the top of the base 51. On both sides of the course traversed by the belt 52, there are rails 55 to guide cans 56 through the machine.

Escapements

Figure 1:
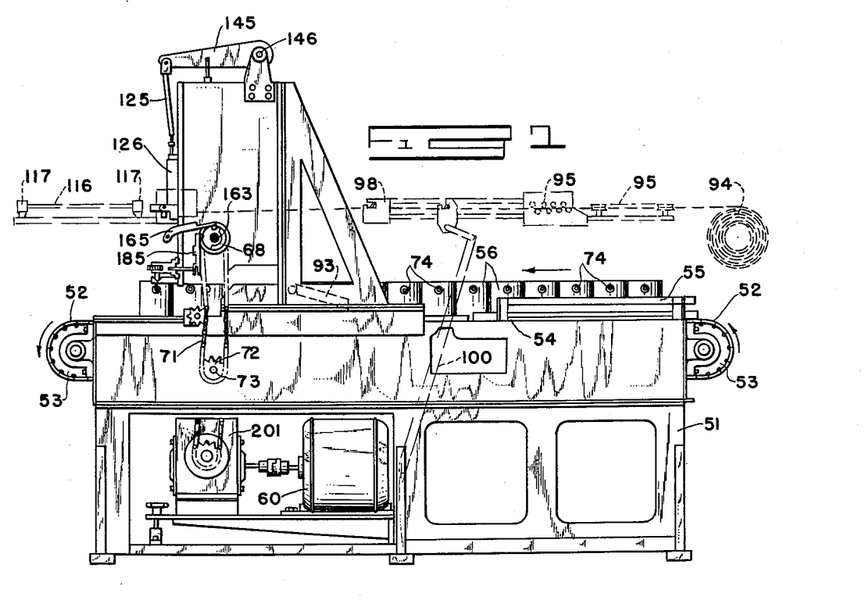
FIGURE 1 is a side elevational view of a bail attacher illustrative of my invention.
Figure 2:
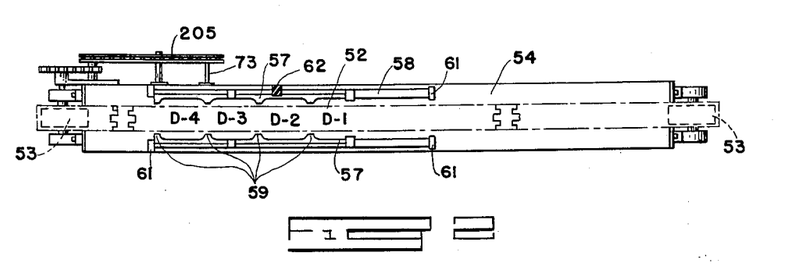
FIGURE 2 is a top-plan view thereof, with the superstructure exploded away.
Figures 3, 4:
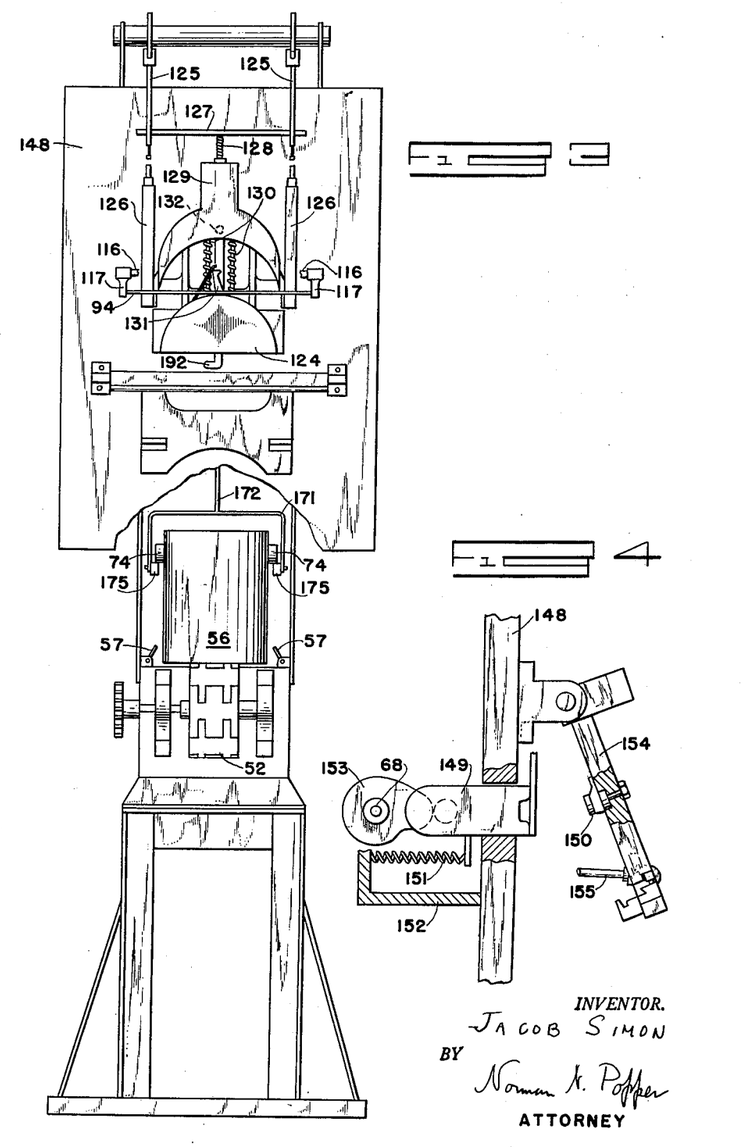
FIGURE 3 is an exit-end view of the bail attacher.
FIGURE 4 is a side view of the male and female dies which form the bale offsets.

Beyond the guide rails 55, immediately adjacent to the belt 52, pairs of opposite escapements 57 are provided. The escapements 57, 57 are rods 58 which are provided with four opposite enlargements 59. These enlargements 59 define four positions D–1, D–2, D–3, D–4 at which cans 24 moving through the machine are held against further progressive movement (see from FIG. 2). During the course of the operation of the machine, the belt 52 moves continuously, being driven by a chain connecting it to the motor 60. The escapements 57 are pivotally mounted on bearings 61. The escapements 57 may be moved from a horizontal position, as shown in FIG. 2 and in FIG. 5, to a nearly vertical position as shown in FIG. 3 in which position, the escapements 57 are in non-detaining relationship with cans 74 moving along on the conveyor belt. The movement of the escapements 57, 57 is effected by a worm 62, mounted on the center of the rods 58. This worm 62 driven (FIG. 10L) by worm gear 63, is mounted on shaft 64. On the other end of the shaft, an arm 65 is mounted. This arm is pivotally connected to a connecting rod 66, (FIG. 10K) which is in turn connected to a cam slider 67, slidably mounted on a cam shaft 68. The contact between the cam slider 67 and the cam 69 is effected by a roller 70 which traverses the face of the cam and is mounted on the slider 67. The cam shaft 68, is driven by a chain 71 (FIG. 1) engaged with a sprocket 72, mounted on the drive shaft 73. It will be seen that the escapements 57, are operated periodically to release the cans for forward motion along the belt 52, successively to each of the four positions D–1, D–2, D–3, D–4 shown in FIG. 2.

When the escapements 57, are in detaining position, the cans are held against forward movement and the belt slides along underneath them. The detaining position, designated D–1, first holds the cans against forward movement, preparatory to releasing one can for advancement to position D–2, which is the orientation position.

*Can Positioner*

When the can reaches position D–2, the sockets 74 on the cans 56 are disposed at random and the cans must be orientated with the sockets disposed diametrically transverse to the path of movement of the cans through the machine in order for a bail to be inserted. When the escapements 57 are detaining a can in position D–2, the can orientation mechanism moves the can into proper position for the insertion of a bail. This orientation of the can 56 at position D–2 (see FIGS. 5, 12 and 18) is accomplished in the following manner: The cam shaft 68 carries a cam 75 which rotates with the shaft 68. The shaft 68 also carries a cam slider or slotted arm 76 with the shaft 68 passing through the slot 77. The arm 76 is positioned immediately adjacent to the cam 75. A rider 78 is mounted on the arm 76 so that its position is governed by the cam 75. Pivotally attached to the end of the slotted arm 76, is a rocker arm 79. This rocker arm is pivotally mounted on the shaft 80 for reciprocal motion. Attached to the opposite end of the rocker arm 79 is a positioning link 81. The positioning link holds a bearing 82. The bearing slidably receives the shaft 83. The shaft is supported for rotation and vertical movement in a bifurcated support 84; between the upper and lower segments of the support 84, a worm 85 is mounted on the shaft 83. In order for the shaft to slide freely in the support 84, a keyway 86 is provided in the shaft for engagement with an internal key in the worm 85. A spring 87 normally urges the bearing 82 downwardly. The end of the shaft is provided with a flange collar 88. This collar is connected to a ring 89 by screws 90. The screws 90 carry springs 91 to yieldably maintain the ring 89 in extended position. The ring 89 is provided with a face 92 of resilient material. This face 92 has a high coefficient of friction.

The can positioner operates in the following manner: When a can 56 reaches position D–2, the cam 75 actuates the arm 79, causing the face 92 on the ring 89 to be brought into engagement with the top of the can 56. The gear 85 is constantly turning the shaft 83 so that immediately, upon contact of the face 92 with the top of the can 56, the can is rotated. This rotation continues until the socket 74, is brought into engagement with the pivotally mounted, weighted stop 93, which engages the socket 74 of the can from being rotated any further although the face 92 is still rotating. It is therefore seen that the frictional engagement of the face 92 with the top of the can is such that when the socket 74 engages the stop 93, the face 92 slides over the top of the can without turning the can 56 further. It is at this point that the can is properly orientated with the socket 74 disposed perpendicularly transverse to the direction of movement of the belt 52. Subsequently, the escapements 57, 57 are operated to release the can, whereupon the belt 52, moves the can forward to position D–3. This is a reserve position at which no operation takes place. The escapement operates to hold the can at this position, eventually permitting the can to advance to position D–4. Before the can is released from position D–2, the orientation mechanism will have again been raised by the arm 81, disengaging the face 92, from the top of the can so that the escapements 57, may release the can for forward movement on the conveyor belt.

The gear 85 is driven by the worm 202. The worm 202 is attached to the sprocket 203 which is driven by the chain 204.

*Wire Feed*

The can 56, having been positioned, a wire bail 94 must be formed to be inserted in the socket 74. Wire 94 from a spool is fed (FIG. 13) into an horizontal and vertical pair of wire straighteners 95, 95 of conventional design. The wire 94 then passes into a gripper 96 that seizes the wire only for forward motion and moves it forward. The gripper 96, in returning to normal position, however, does not grip the wire 94. This gripping effect is the result of pressure exerted upon the wire by a spring-loaded pressure plate 97; the wire 94 is advanced through a second gripper 98. The first gripper 96 is mounted on a shaft 99 and is caused to reciprocate thereon by a pivotally connected link 100. This link is driven by a connecting rod 101. The connecting rod 101 is connected to a crank 102, mounted on the end of the main drive shaft 73, (FIG. 1) whereby the connecting rod 101 is caused to reciprocate.

Figures 14, 15:
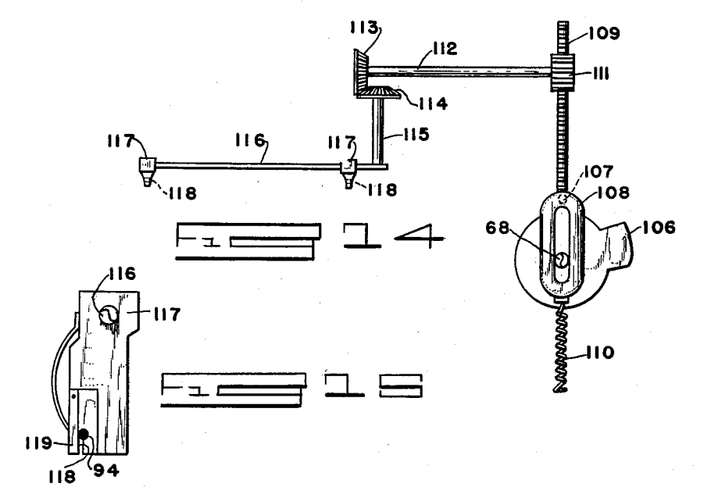
FIGURE 14 is a side elevational view of the drive and pivoted arm which transport the wire from the stationary arm to the forming position.
FIGURE 15 is an end view of the stationary arm and pivoted gate.
Figure 16:
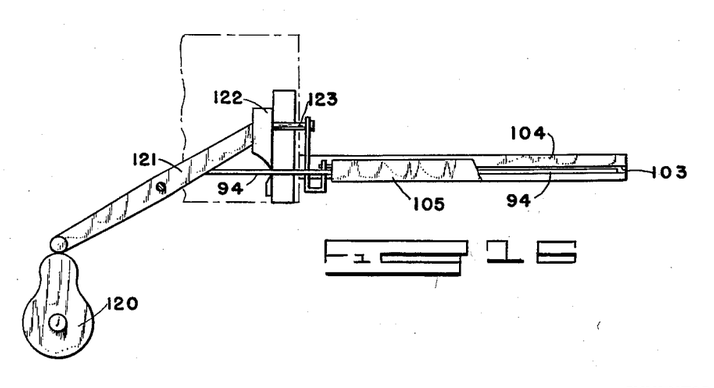
FIGURE 16 is a side elevational view of the stationary arm with part of the pivoted gate exploded away.

From the second gripper 98, the wire is advanced into a channel 103 (FIG. 16), in a stationary arm 104. A pivoted gate 105 normally closes the channel 103 so that the wire 94 lies enclosed within the channel. When the grippers 96, 98 have advanced a length of wire into the channel 103, the rotation of the cam shaft 68, on the machine, brings a cam 106 (FIG. 14), into engagement with a cam rider 107, mounted on a cam slider 108, causing a reciprocating movement of a rack 109, attached to the cam slider 108. A spring 110, maintains the cam slider 108 in normal position. The rack 109 engages a pinion 111 causing the rotation of the shaft 112. A bevel gear 113 on the end of the shaft 112, engages another bevel gear 114 on the end of a vertical shaft 115. This vertical shaft rotates and swings a movable arm 116. At the bottom of the arm 116, a pair of enlargements 117 are formed. These enlargements have wire slots 118 which are positioned in alignment with the channel 103 in the stationary arm 104. As shown in FIG. 15, each enlargement 117 is provided with spring loaded, hinged retainer or holder 119, to releasably secure the wire in a circular seat at the top of the slot 118. When a suitable length of wire 94, lies in the channel 103, the cam shaft 68, rotating in timed relation to the wire grips 96, 98 rotates a wire cutter cam 120, which actuates a pivoted arm 121. The pivoted arm has mounted thereon a blade 122 which cuts off an appropriate length of wire 94. The pivoted arm 121, likewise has a finger 123, which is connected to the channel gate 105, pivoting it downwardly to expose the wire 94, lying in the stationary arm channel 103. At this time, the cam 106, as shown in FIG. 14, pivots the arm 116. The wire 94 lies in the slots 118, 118 of the movable arm 116 and is transported horizontally through a 90° arc disposing it in position for being formed into a handle for a can as shown in FIG. 3. A length of wire has been fed, cut to the appropriate length, and carried over into position to be gripped by the bail forming dies. The spring 110 restores the movable arm 116 from wire discharge position shown in FIG. 3, to normal pickup position shown in FIGS. 13 and 14 when the rider 107 rides off the cam 106. The apparatus is then in condition to feed, cut and transport another bail.

Referring to FIG. 3, it will be seen that the pivoted arm 116 has moved over to bring the wire into position over the die 124, upon which the bail will be formed. The wire 94, which is to become the bail, is still retained in the slots 118, by the holders 119. At this point, the rods 125, 125 begin to descend lowering the wipers 126, 126 which wrap the wire 94 around the die 124 to assume the shape of the bail 94. As the rods 125 descend, they carry with them a connecting link 127, carrying with it a spring loaded plunger 128 which moves downwardly to engage a holding plate 129. This holding plate 129 is slidably mounted upon a pair of rods 130, 130, which carry springs which normally urge the holding plate 129 to disengaged position shown in FIG. 3. As the wipers 126, 126 continue their descent, forming the bail 94 around the die 124, the holding plate 129 reaches a position where it is in full engagement with the die 124. When it reaches this position, a spring-loaded latch 131 engages a pin 132 on the back of the holding plate 129, causing the partially formed bail 94 to be held between the die 124 and the plate 129. Attention is directed to the sequence of figures designated as FIGS. 11a, b, c, d, e. In 11a, the wire is shown disposed over the die 124; in 11b, the wipers 126, 126 have deformed the wire 94 over the die 124. The die 124, now carrying a partially formed bail 94, now moves to a second position where offsets in the bail 94 are made.

Figures 5, 18:
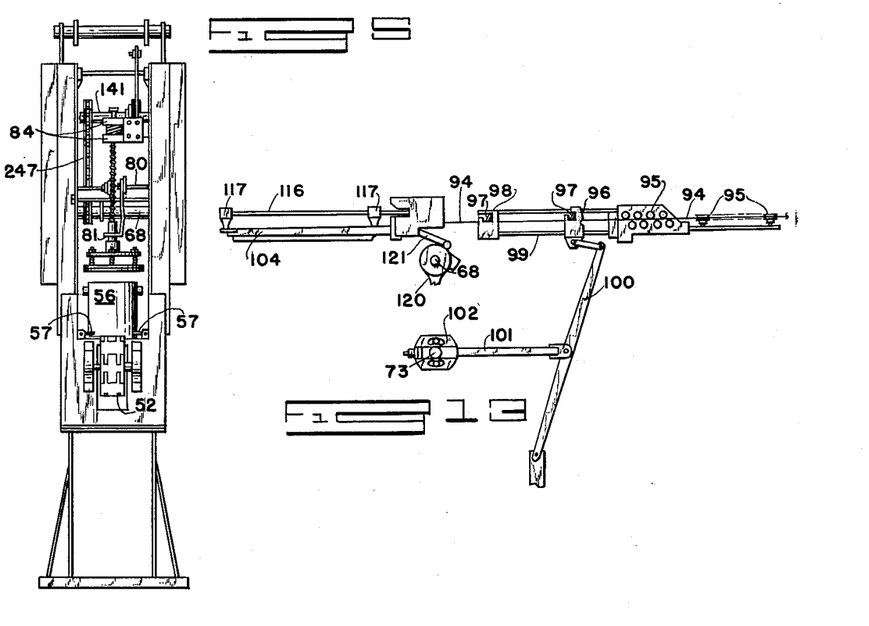
FIGURE 5 is an entrance-end view of the bail attacher, showing the can positioner.
FIGURE 18 is a side elevational view of the can twister, can stop, and means to elevate the can twister.
Figure 10:
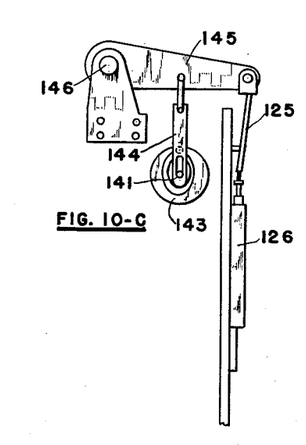
FIGURE 10A is a side view of the positioning means for the bail forming die and the cam that drives it.
FIGURE 10B is an end view of the side wipers.
FIGURE 10C is a side view of the wiper device.
FIGURE 10D is a side view of the cam drive for the mounting plates and for the racks which drive the bail twister pinions.
FIGURE 10E is a view of FIGURE 10 with the rack for twisting the pinion gears added.
FIGURE 10F is a bottom view of the rack and pinions positioned to release the bail.
FIGURE 10G is a view of the drive for the bail twisting racks.
FIGURE 10H is a bottom view of the rack and pinions in overbend position for the offsets of the bails.
FIGURE 10I is a view of the bail being inserted in the can sockets.
FIGURE 10J is a view of the can lifter and can lifter cam.
FIGURE 10K is a side elevational view of the escapement drive.
FIGURE 10L is a partial sectional view of the escapement drive shown in FIGURE 10K.
Figures 1, 10:
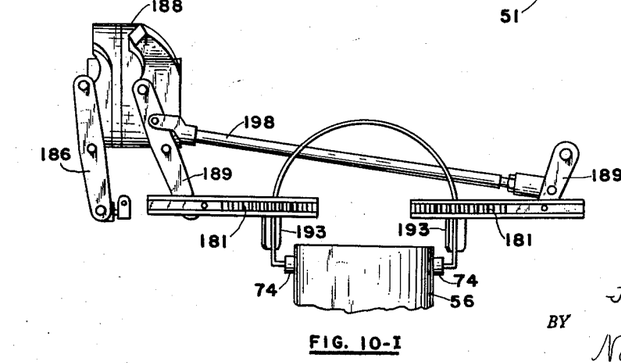

In FIG. 10a, a rack 133, is shown on the back of the die 124. The rack is driven by a pinion 134. The pinion 134 is attached to a second pinion 135. The pinion 135 is driven by a sector 136 which is pivotally mounted on the shaft 137. The sector is pivotally connected to a link 138 by the pin 139. The link 138 is attached to a cam slider 140, carried by a second cam shaft 141. The second cam shaft 141 is operably connected to the first cam shaft 68 by the chains 247 (FIG. 5). Mounted on the second cam shaft 141 is a box cam 142. The movement of this box cam governs the position of the die 124.

Mounted on the same cam shaft 141 is another box cam 143 (FIG. 10c). This box cam 143 governs the action of the cam slider 144, which is connected to a reciprocating arm 145, pivoted on the shaft 146. There is also a corresponding reciprocating arm 147 (FIG. 10b). The ends of the reciprocating arms 145, 147 are pivotally secured to the rods 125, 125 which actuate the wipers 126.

Figure 6:
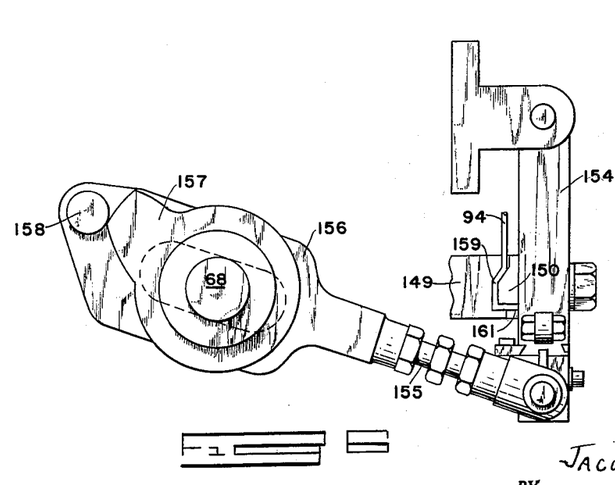
FIGURE 6 is a side view of the drive for the bail offset former shown in FIGURE 4.
Figure 11:
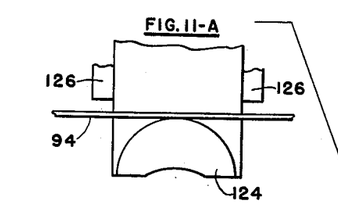
FIGURE 11 is a series of views showing the formation and insertion of a bail.

As soon as the bail 94 is completely arched around the die 124 (FIG. 11b), the wipers 126, are withdrawn through the action of the box cam 143 (FIG. 10c). The die 124, through the action of the box cam 142, is lowered to another position, the position at which offsets are formed (FIG. 11c). Mounted on the end of the base 51, there is an upright end portion 148, which carries a female die 149 (FIG. 4). This die forms an offset in the handle by cooperative engagement with the male die 150. The female dies 149, 149 (one for each leg of the wire 94) are arranged in correspondence with the position assumed by the end of the bail 94 and are connected to a spring 151 mounted on the bracket 152. These female dies 149, 149 are normally held in retracted position until the face cam 153, mounted on the first cam shaft 68, urges the cam forward. The upright end portion 148 also serves as a pivotal mounting for the die carrier 154. Attached to the inner face of the die carrier 154, are a pair of male offset dies 150, 150. The die carrier 154 is moved by a link 155 connected to a cam slider 156 (FIG. 6). The cam slider 156 is carried by the cam shaft 68. The main cam shaft 68 carries a cam 157 which engages the cam rider 158 mounted on the cam slider 156. The cooperation of the dies 149, 150 results in an offset 159 in the partially formed bail 94. The offsets 159, 159 so formed leave the ends 161, 161 of the bail disposed perpendicular to the plane defined by the arch of the bail, and ready to have each of these ends of the bail deformed inwardly as shown in 11c to ultimately assume the shape shown in FIG. 11d. With the bail in the condition shown in FIG. 11d, it is ready to have its ends inserted in the sockets of the can. The inner face of the die carrier 154, has a pair of spring loaded side wipers 160, mounted for cooperative engagement with the ends 161, as they extend perpendicularly to the plane defined by the arch of the bail 94. The position of these ends 161 may also be seen in FIG. 6, as well as FIG. 11c.

Figure 7:
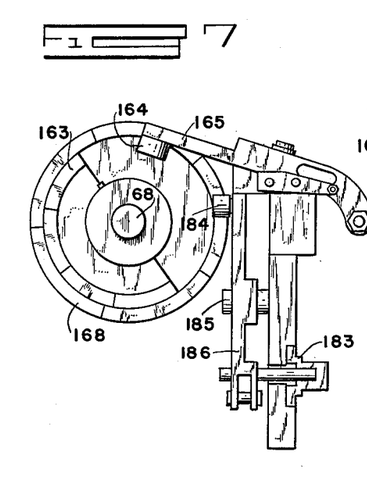
FIGURE 7 is a side-elevational view of the outer double track cam which operates the offset forming dies and the end forming wiper.
Figure 17:
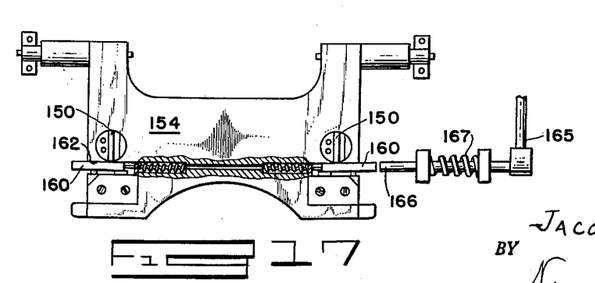
FIGURE 17 is a view of the inner face of the die carrier showing the end wipers.
Figures 18, 19:
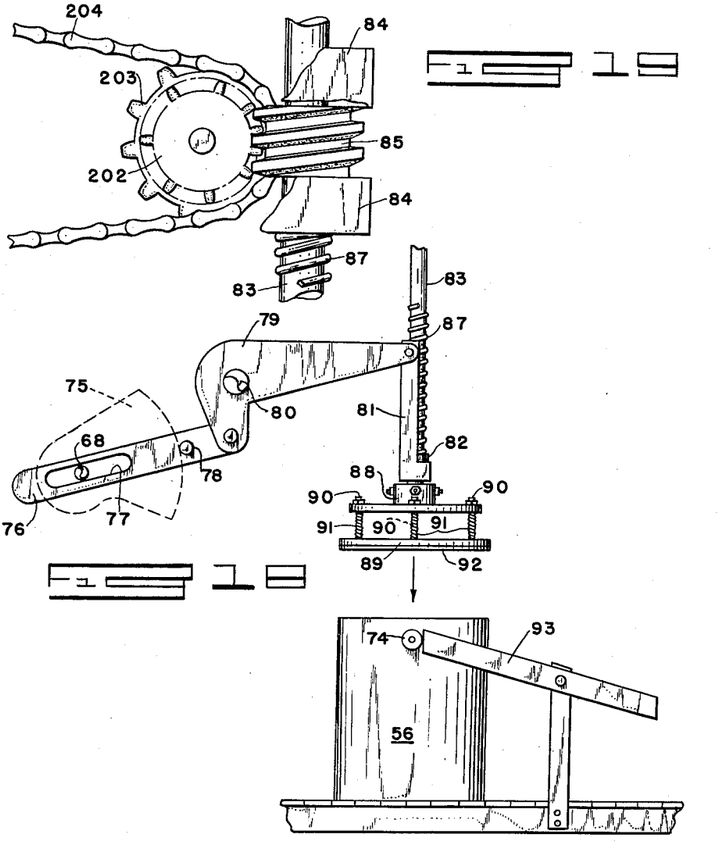
FIGURE 19 is a partial side elevational view of the can twister drive.

The inner face of the die carrier 154 as shown in FIG. 17 has a pair of slots 162 immediately below the male die 150. The side wipers 160 slide in these slots. The side wipers 160 are actuated in timed relation to the die carrier 154, by a cam having a cam-track 163 and mounted on the end of the first cam shaft 68. This cam-track 163 engages the cam rider 164 mounted on the pivoted arm 165 in order to pivot the arm 165 inwardly. The end of the arm engages a push rod 166 at one end thereof. The opposite end of the rod 166 engages the end of the side wiper 160, as appears in FIG. 7a. The spring 167 normally maintains the push rod 166 in disengaged relationship to the side wiper 160.

The opposite side wiper 160 is similarly driven inwardly in coincidence with its mate by a similar opposite cam-track 163, corresponding with the opposite cam-track 163, mounted on the opposite end of the cam shaft 68, which in turn operates a corresponding arm 165, which engages a corresponding opposite push rod 166; a spring 167 is also used to restore the opposite push rod 166 to normal.

It will be noted that there is a second cam-track 168 which is disposed at the peripheral edge of that member. The side wipers 160, 160 having been urged inwardly by the push rods 166, 166 which deform the ends 161 of the bail inwardly to dispose them in the same plane in which the arch of the bail lies (FIG. 11d). The ends 161 then are pointing inwardly for insertion into the sockets 74 of the cans. It only remains for the ends 161 to be brought into alignment with the sockets. The die 124 which carries the bail must therefore be moved to a still lower position so that the ends 161 are in alignment with the sockets 74. The die 124 assumes this position by virtue of the cam rider 164 (FIG. 10a), reaching a new sector of the cam-track in the box cam 142. The sector 136, being further shifted, again imparts a corresponding movement of the pinion 134 and the rack 133, until the ends 161 are in alignment with the sockets 74 (FIG. 11e). As the bail 94 is advanced to this position for insertion, the escapements 57, 57 have pivoted to release a can from position D–3 and the conveyor belt 53 carries the can forward to position D–4 where the escapements (again rotated downward) once more stop the can 56. The sockets 74 are precisely, transversely aligned, and a can lifter comes into operation to raise the can be the sockets and bring the sockets into alignment with the ends 161 of the bail 94.

*Can Lifter*

Figure 8:
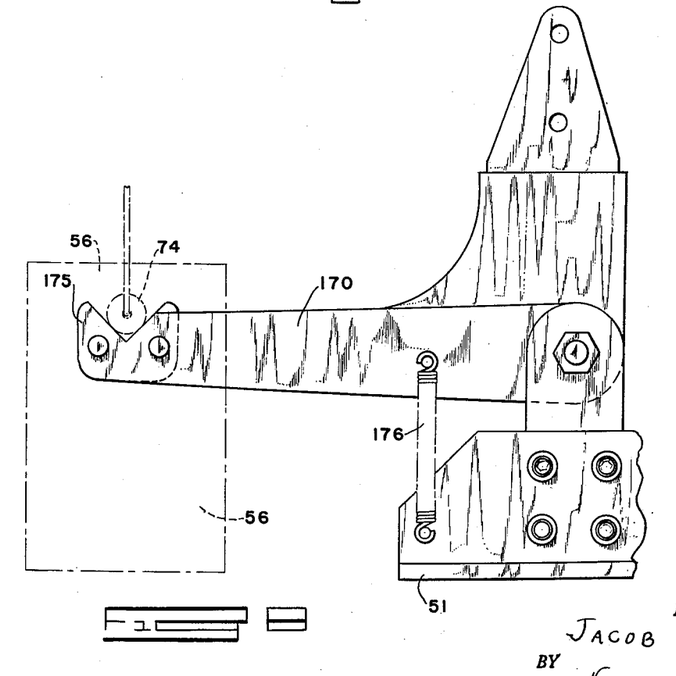
FIGURE 8 is a side-elevational view of the can lifter.
Figure 9:
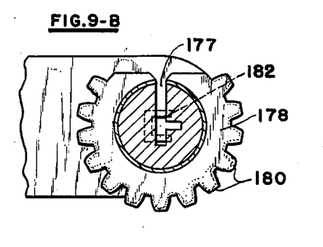
FIGURE 9a is a view of the housing and pinion gear for twisting the bail.
FIGURE 9b is a top plan view of the housing and slotted pinion gear that twists the offsets of the bail.
FIGURE 9c is a vertical sectional view of the housing, pinion gear and bail guide.
FIGURE 9d is a bottom view of the rack and pinion positioned to receive the bail.
FIGURE 9e is an end elevational view of the bail inserter assembly for transporting the twisting pinions inwardly in order to insert a bail into a can socket.

The can lifter consists of a pair of pivoted arms 170, mounted on the base 51 on both sides of the track immediately adjacent to position D–4. These arms are formed integrally with a yoke 171. An extension 172 on the yoke carries a cam rider 173 which engages the cam 174, mounted on the cam shaft 68. This cam 174 is dimensioned so as to lift a can substantially coincident with and in timed relation to the insertion and twisting of the end of the bail 94 as will be hereinafter set forth. The ends of the arm 170 are provided with a seat 175, that comes up underneath the socket 74 and raises the can from the continuously moving belt 53. The cam 174 is so dimensioned as to return the can to the belt 53 at the conclusion of the insertion operation. A spring 176 restores the lifter arms 170 to normal position as the cam rotates. The downward movement of the die 124, carries the ends 161, into a slot 177 (FIGS. 8, 9B, 9D), in a pinion gear 178. This slot 177 precisely conforms to the offset 159 formed as shown in FIG. 11c and the ends 161 extend below the pinion gear. The pinion gear is carried for rotation by a split housing 179, from which its teeth 180 protrude for engagement with a rack 181 (FIG. 9D). The pinion gears 178 are arranged in pairs, each receiving one end of the bail 94. In order to properly insert the bail into the pinion gears 178, 178, a slotted guide 182 is provided above each of the pinion gears (FIG. 9C) so as to properly channel the bail 94 with its offsets 159 into engagement with the slot 177 in the pinion gear 178. Normal positioning of the slots 177, 177 at the start of bail insertion is as shown in FIG. 10d.

The rack 181 and pinion 178 are slidably mounted for inward and outward movement on a pair of plates 183 (FIG. 9e). These plates 183, 183 are urged inwardly towards each other in order to insert the ends 161, 161 into the sockets 74. This insertion is carried out in timed relation to succeed the arrival of the die 124 carrying the bail, at its lowest position. At that time, the rider 184, which traverses the outer cam-track 168 moves the arm 186 on its pivot 185. The plate 183, being connected on one side to the arm 186, moves toward center carrying the slotted finger 193 inwardly. Likewise on the opposite side of the apparatus, a cam having a similar track 168 (FIG. 1) drives a similar arm 185 pressing the other plate 183 (of the pair) inwardly (FIG. 9e). The slotted fingers 193 insert the ends 161 in the sockets 74. At this time, the cam rider 187 (FIG. 10d) reaches a gradient in the cam 188, by virtue of which it moves pivoted arms 189 connected to the racks 181, so that they move toward each other. The movement of the opposite rack is effected by the connecting rod 198, and by the pivoted arm 189 which is connected to that opposite rack. The movement of these racks 181, 181 is transmitted to both of the pinion gears 178, 178 by engagement therewith; they rotate in the housings 179, 179 until the slots 177 in the pinion gears 178 have been turned 90° in opposite directions. As has been previously noted, the slots 177, 177 in the pinion gears have closely engaged the offsets 159, 159 near the ends of the bail 94 and these offsets are now twisted 90° by the slots 177, 177. In twisting the offsets 159, 159, the ends 161, 161 which have been inserted in the sockets 74, 74 are twisted 90° to be disposed transversely to the axis of insertion into the sockets 74, and this twist exceeds the elastic limits of the material of which the bail 94 is made. The result is that the ends 161 are permanently disposed in hooked relation to the entrance hole of the sockets 74, 74 and the bail is permanently affixed to the can 56. Since the slots 177 in the pinions are disposed in axial alignment with the bail, the plates 183 may now be moved outwardly to normal position freeing the bail from engagement with the slots 177, 177. When the slots 177 are free of the bail 94, the track 188, changes course and returns the pinions 178, 178 from the position shown in FIG. 10F to the starting position shown in FIG. 9D.

Coincident with the inward moving of the plates 183, a stud 191 (FIG. 10H) engages the lower end 192 (FIG. 3) of the latch 131, to disengage it from the pin 132; whereupon the springs 130, 130 restore the die 124 to starting position (FIG. 3). Coincident with the slot 177 in the pinion gears 178, and depending therefrom, there are slotted fingers 193 (FIGS. 10E, 10G, 9A, 9C) which receive and hold the offsets 159 for twisting. Above the slots 177, guides 182, 182 direct and guide the bail 94 and the offsets 159, 159 into the channels 177, 177.

The return of the plates 183 to normal position is effected by means of the springs 194, 194 (FIG. 9E) when the cam-track 168 presents a new gradient surface to the cam rider 184. The lifting arm 170 having restored the can 56 with the bail attached to the belt 52, the escapement 57 is pivoted in timed relation to release the can 56, which is carried forward by the belt 52, to be succeeded at position D-4 by the next can.

The chain 204 which drives the can orientation mechanism is driven by the second cam shaft 141 (FIG. 20). The chain 217 drives the second cam shaft 141 by being driven by the first cam shaft 68. The chain 71 which drives the cam shaft 68 is driven by the main drive shaft 73. The chain 205 is driven by the main drive shaft 73 and operates the sprockets 53 to drive the conveyor belt 52. The main drive shaft 73 is driven by the belt 206 connected to the speed reducer 201. The speed reducer 201 is driven by the motor 60.

The operation of the bail inserter is as follows: A can on the continuously moving conveyor belt is detained by the escapements; operating in timed relation to the escapement is the can positioner which twists the can. Operating in timed relation to the escapements is the can lifter which pushes up the can from the belt and holds it for insertion of its bail. Operating in timed relation to the can lifter is the bail-former; for each can lifting operation, it feeds, cuts, forms, and inserts a bail in the can socket. The cam tracks governing these various operations have cam surfaces coordinated to successively perform each of these operations.

Upon insertion of the bail in the socket and the overbending of the offsets to make the insertion permanent, the can lifter lowers the can to the belt, and the escapements release the can to be carried forward and discharged by the conveyor belt.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A bail inserter comprising a pair of mounting plates, racks slidably mounted on each of the mounting plates, pinions rotatably engaged with each of the racks and carried by the mounting plates, each of the pinions having slots dimensioned to receive and closely engage offsets on a bail and also to pass therethrough inturned ends of the bail, means for moving the mounting plates with the racks and the pinions in fixed relation toward each other to insert the inturned ends of the bail into can socket holes, a means for moving each of the racks relative to the pinions to rotate the pinions whereby offsets on the bail are permanently deformed, and the inturned ends of the bail are permanently disposed transversely to the hole in the can-sockets.

2. A bail inserter comprising a pair of mounting plates, racks slidably mounted on each of the mounting plates, bifurcated twister pinion housings having top, bottom, and side openings mounted in housings on each of the plates, rotatably positioned in each of the housings and rotatably engaged with the racks, each of the pinions having slots dimensioned to receive and closely engage offsets in a bail, means for moving the mounting plates toward each other until ends of the bail are inserted into can socketholes, means for moving each of the racks to rotate the pinion whereby offsets on the bail which are closely engaged in the slots in the pinions are permanently deformed and the inturned ends of the bail are disposed transversely to the hole in the can-sockets.

3. A bail inserter comprising means for feeding a wire, means for cutting the wire, a stationary arm to receive the cut wire and a pivoted arm, enlargements on the pivoted arm in general conformity with each end of the stationary arm, the enlargements and the stationary arm having coaxial wire receiving slots for a length of wire cut from the feeding means, spring loaded retainers on each of the enlargements to retain the wire in the slots, a gate disposed as a closure for the slot in the stationary arm, means to open the gate and to pivot the pivoted arm to transport the wire from the slot in the stationary arm to a bail-forming die.

4. A bail inserter comprising a generally arcuate die, a slidably mounted holding plate, a spring normally urging the holding-plate away from the die, means for overcoming the spring and moving the holding-plate into engagement with the die, latch means for engaging the holding-plate and die together, side wipers, a means to move the side wipers alongside of the die to wrap a wire around a portion of the die, a pair of cooperative offset-forming dies, means for moving the die and holding plate to bring the ends of the wire extending beyond the die into correspondence with offset-forming dies, offset-forming dies, means to engage the offset-forming dies with the ends of the wire to form offsets adjacent to the ends of the wire, end-wipers slidably mounted adjacent to the offset-forming dies for movement toward each other, means to move the end wipers toward each other and to deform the ends of the wire toward each other, means to move the die and holding plate to insert the ends of the wire and offsets into a slotted pinion.

5. A bail inserter comprising a pair of mounting plates, means for moving the mounting plates toward each other, a pair of racks slidably mounted on the mounting plates, a pair of pinions rotatably mounted on the mounting plates in engagement with the racks, first slots in the pinions normally disposed to receive and intimately engage offsets of a bail, second slots intersecting with the first slots to pass the inwardly disposed ends of the bail, means for moving the racks to rotate the pinions until the offsets of the bail have been twisted and until the inwardly disposed ends of the bail are disposed transversely to the opening in a can socket.

6. A bail inserter in accordance with claim 5 in which the slots in the pinions are rotated approximately 90°.

7. A bail inserter comprising a housing having an aperture therein, a pinion disposed in the housing, a rack engaged with the pinion, the pinion having a vertical slot and a transverse intersecting slot for receiving an offset and a transverse end of a bail, means to reciprocate the rack, the housing having a slot defining a passage for the offsets of the bail to move, a means to reciprocate the housing.

8. A bail inserter comprising a die, means to wrap a wire on the die into an arch, means to hold the wire to the die, a pair of dies, a means to engage the dies together to form offsets transverse to the plane defined by the arch, means to bend ends of the wire toward each other in the plane of the arch, means to hold the offsets, means to move the offsets toward each other until the ends of the wire enter can sockets, means to twist the offsets until the ends are disposed transverse to can sockets.

9. A bail inserter comprising feeding and positioning means including a conveyor for cans, a means to continuously drive the conveyor, an escapement, a plurality of enlargements on the escapement normally disposed to arrest forward movement of cans on the conveyor at a plurality of stations, means to intermittently pivot the escapement to release cans for forward movement on the conveyor, a pressure plate adjacent to the conveyor at a first station, a means to rotate the pressure plate and move it intermittently downward to frictionally engage the top of a can in timed relation to the arrested forward movement of a can by the enlargement and to rotate a can, a stop positioned to engage a can socket against further rotation by the plate, a pair of lifting arms at a second station, seats defined on the lifting arms to engage the can sockets which have been oriented at the first station for engagement with the lifting arms, means to intermittently raise the lifting arms to engage can sockets in the seats and to lift a can by the sockets to a bail inserting position;

and comprising further a wire cutting and transporting means including a wire feed, a wire cutter to cut wire fed, a stationary wire holder to hold the cut wire, a pivoted wire holder to transport the wire to a wire forming means, and means to operate the feed, cutter, and pivoted wire holder in timed relation to each other, and comprising further a wire forming means to receive wire from the cutting and transporting means including a die for receiving the wire from the pivoted wire holder, a means to hold the wire on the die, side wipers movable to wrap the wire over the die, offset forming dies positioned to form offsets near the end of a wire on the die, end wipers adjacent to the die to deform the ends of a wire toward each other; means for moving the die downward to a wire inserting and twisting means, for engaging the holding means with the die, for driving the side wipers, for driving the offset forming dies, and for driving the end wipers;

and comprising further a wire inserting and twisting means including a pair of slotted pinions positioned to receive the formed wire from the die and twist the offsets on the wire, the pinions movable to insert the ends of the wire into can sockets as they rest on the lifting arms, means to move the pinions toward each other and to rotate the pinions to twist the offsets on the wire and to permanently deform the wire so that the ends of the wire are disposed transversely within the can socket, means to withdraw the pinions from engagement with the wire; the feeding and positioning means, the wire cutting and transporting means, the wire forming means, and the wire inserting and twisting means operating in timed relation to each other.

10. A bail inserter comprising feeding and positioning means including a continuously operating conveyor for cans, means to drive the conveyor, a first enlargement disposed in spaced relation to the conveyor and movable into detaining engagement with a can on the conveyor and to arrest a can's progress at a first station while the conveyor slides beneath the can, a plate at the first station, means to lower intermittently the plate into engagement with the top of a can at the first station, means to turn the plae while frictionally engaged with the top of a can detained on the conveyor, a detent adjacent to the first station positioned to engage the socket on the side of a can against rotation beyond the detent, a means to disengage the first enlargement from a can held at the first station and operable in timed relation to the engagement of the plate, a second enlargement disposed in spaced relation to the conveyor and movable into detaining engagement with a can on the conveyor and similarly to arrest its progress at a second station, a pair of lifting arms adjacent to the second station and engageable with sockets on a can after the sockets have been properly oriented for engagement with the arms at the first station, means to operate the lifting arms and timed to lift a can from the conveyor as it reaches and is stopped by the enlargement at the second station, and comprising a wire cutting and transporting means including a wire feed, a wire cutter to cut wire from the wire feed, a stationary arm to receive wire from the wire cutter, a pivoted arm to convey wire from the stationary arm to a wire forming means, and means to operate the wire feed, the wire cutter, and the pivoted arm in timed relation to each other, and comprising further a wire forming means to receive wire from the cutting and transporting means including a wire bender to receive wire from the pivoted arm and to form an arch in the wire, a punch adjacent to the wire bender to bend an offset in the wire, a bender adjacent to the wire bender to bend the end of the wire, and comprising further a wire inserting and twisting means including a slotted pinion adjacent to the wire bender, means to move the wire bender to insert the offset into the slotted pinion, means to move the pinion to insert the end of a wire whose offset is engaged with the pinion into a socket of a can in lifted position on the lifting arms, means to turn the pinion to twist the offset in the wire and to turn the end of the wire permanently transverse inside the entrance to the socket in a can, means to lower the lifting arms to return the can to the conveyor at the second station in timed relation to the conclusion of the turning of the end of the wire, and means to drive in timed relation to each other: the wire bender, the offset punch, the bender, the pinion, the means to move the pinion, the means to turn the pinion and the means to lower the lifting arms.

References Cited in the file of this patent

UNITED STATES PATENTS

| | | | |
|---|---|---|---|
| 1,343,920 | Kenny | June 22, | 1920 |
| 1,403,169 | Kenny | Jan. 10, | 1922 |
| 1,435,336 | Russell | Nov. 14, | 1922 |
| 1,595,868 | Rickenhrode | Aug. 10, | 1926 |
| 1,665,334 | Versaw | Apr. 10, | 1928 |
| 1,879,984 | Leigh | Sept. 27, | 1932 |
| 1,940,484 | Barber | Dec. 19, | 1933 |
| 2,154,071 | Gorman | Apr. 11, | 1939 |
| 2,206,661 | Carroll | July 2, | 1940 |
| 2,268,117 | Gorman | Dec. 30, | 1941 |
| 2,272,700 | Gorman | Feb. 10, | 1942 |
| 2,530,222 | Bohaboy | Nov. 14, | 1950 |
| 2,596,734 | Skowron | May 13, | 1952 |
| 2,623,274 | Henchert | Dec. 30, | 1952 |
| 2,654,403 | Roe | Oct. 6, | 1953 |
| 2,771,177 | Cutter et al. | Nov. 20, | 1956 |
| 2,779,356 | Schulze | Jan. 19, | 1957 |
| 2,787,364 | Beck | Apr. 2, | 1957 |
| 2,819,784 | Brown | Jan. 14, | 1958 |
| 2,943,724 | McCoy | July 5, | 1960 |
| 2,968,387 | Lagler | Jan. 17, | 1961 |